United States Patent
Bosch et al.

[11] Patent Number: 5,671,235
[45] Date of Patent: Sep. 23, 1997

[54] SCAN CHAIN FOR SHIFTING THE STATE OF A PROCESSOR INTO MEMORY AT A SPECIFIED POINT DURING SYSTEM OPERATION FOR TESTING PURPOSES

[75] Inventors: Derek Bosch, San Jose; Susan Carrie, Mountain View, both of Calif.

[73] Assignee: Silicon Graphics, Inc., Mountain View, Calif.

[21] Appl. No.: 567,082

[22] Filed: Dec. 4, 1995

[51] Int. Cl.$^6$ .................................................. G01R 31/28
[52] U.S. Cl. ........................................................ 371/22.3
[58] Field of Search ................................ 371/22.3, 22.2, 371/22.1, 21.5, 21.1, 21.2, 22.5, 22.6; 395/183.06; 365/200, 201.1; 324/158 R

[56] References Cited

U.S. PATENT DOCUMENTS

| | | | |
|---|---|---|---|
| 4,733,392 | 3/1988 | Yamaguchi | 371/21 |
| 4,894,830 | 1/1990 | Kawai | 371/22.3 |
| 5,175,494 | 12/1992 | Yoshimori | 324/158 R |
| 5,355,342 | 10/1994 | Ueoka | 365/201 |
| 5,383,195 | 1/1995 | Spence et al. | 371/22.5 |
| 5,394,403 | 2/1995 | Klein | 371/21.1 |
| 5,553,082 | 9/1996 | Connor et al. | 371/25.1 |

*Primary Examiner*—Hoa T. Nguyen
*Attorney, Agent, or Firm*—Wagner, Murabito & Hao

[57] ABSTRACT

In a semiconductor device having a processor for processing digital data and RAM for storing the digital data, an apparatus for accessing the state of the digital data stored in the RAM during system operation for testing purposes. A stall controller is used to stall the processor at a specified point of execution during system operation. The state of the processor at that particular point is shifted out of the registers by using a scan chain and temporarily stored into a buffer. A memory controller then instructs the RAM to write the data of interest into a specific set of test registers. The scan chain is routed through these test registers so that it can serially shift out the data written from the RAM. Thereby, the RAM contents can be accessed with minimal overhead by using the scan chain. Once the data has been shifted out from test registers, the current state of the processor that was stored into the buffer is fed back to the processor. The processor is unstalled and allowed to continue with its normal mode of operation.

17 Claims, 5 Drawing Sheets

5,671,235

SCAN CHAIN FOR SHIFTING THE STATE OF A PROCESSOR INTO MEMORY AT A SPECIFIED POINT DURING SYSTEM OPERATION FOR TESTING PURPOSES

FIELD OF THE INVENTION

The present invention relates to accessing the state of a semiconductor device during system operations for testing and debugging purposes.

BACKGROUND OF THE INVENTION

Electronic devices in the fields of computer systems, telecommunications, instrumentations, etc., are becoming ever more versatile, powerful, and faster. This is all made possible through advances in semiconductor technology. In today's competitive markets, semiconductor "chips" are becoming bigger and more complex in order to meet the demands for state-of-the-art performance. A single processor can contain upwards of millions of transistors. Moreover, semiconductor circuits are compacted as much as possible in order to minimize the die size (a smaller die directly translates into lower manufacturing costs because more chips can be fabricated from a given wafer). As a result, testing these chips and isolating any faults has become a much more critical and difficult task. Furthermore, there is a physical limitation as to the maximum number of pins that can be implemented for any given chip. As chips become more complex and larger and as the logic density increases, it is becoming more impractical to consume valuable pins for testing and debugging purposes.

One method for testing these chips in the past has been to use functional test vectors for configuring the chip into certain states and individually testing each of the possible signal paths of that particular state. However, this process is very time-consuming, tedious and labor-intensive as it requires specialized, test engineers to program the testing system for generating the proper test vectors tailored to that specific chip design. Furthermore, each manufactured chip must be separately tested to ensure that it is working properly. Hence, there is a trade-off between fully testing the chip and sacrificing time to market.

A faster method for testing semiconductor chips has been to use "scan chains". Basically, scan chains are additional circuitry incorporated into the chip layout, which shift out the bits of information contained in the registers of interest. Hence, one can access the state of the processor to determine whether the chip is working properly by simply examining the bits of information that were shifted out via the scan chain.

However, scan chains are typically limited to reading the state of the registers and not the contents of any on-chip memory (e.g., RAM). Oftentimes, it is extremely helpful during trouble-shooting and debugging if one could also access the state of the RAM. For example, if there is an error in a newly developed piece of software code, an engineer could run the code and monitor the contents of the RAM at certain points to determine whether the code was functioning properly up to that particular point. This greatly facilitates fault identification and isolation. In an effort to monitor the state of the RAM, designers have added specialized circuitry. The circuitry typically includes implementing separate parallel data paths to the RAM, dedicated RAM control test logic, lines to conduct various test signals, and external pin interfaces. All of this additional hardware comes at a cost in terms of added overhead and the consumption of valuable routing resources. Further complicating matters is the fact that the test circuitry must meet tight timing constraints imposed by the RAM.

Thus, there is a need for an apparatus and method that provides for the straight readback of RAM in a functional mode diagnostic. It would be preferable if such an apparatus and method could be achieved with minimal associated overhead.

SUMMARY OF THE INVENTION

The present invention pertains to an apparatus and method for accessing the state of a semiconductor device at a specified point during system operation. In the currently preferred embodiment, the present invention allows access to the contents of RAM during execution. A stall controller is used to stall the processor when the specified point of interest is reached during normal system operation. An internal scan controller and scan chain are used to shift out the state of the processor at that instance. The current state is then temporarily stored into a buffer. Once the current state has been preserved, the scan controller instructs the RAM controller to read data from specified RAM addresses and transfer it into specific RAM interface registers. The scan chain is routed through these registers so that the scan chain can serially shift out the data for examination and testing purposes. In this manner, the RAM contents can be accessed with minimal overhead by using the scan chain. Once the RAM data has been shifted out from test registers, the current state of the processor that was stored into the buffer is then fed back to the processor. The processor is unstalled and allowed to continue with its normal mode of operation. The present invention can also be applied to write data into RAM memory.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An apparatus and method for accessing the state of a semiconductor device during system operation is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
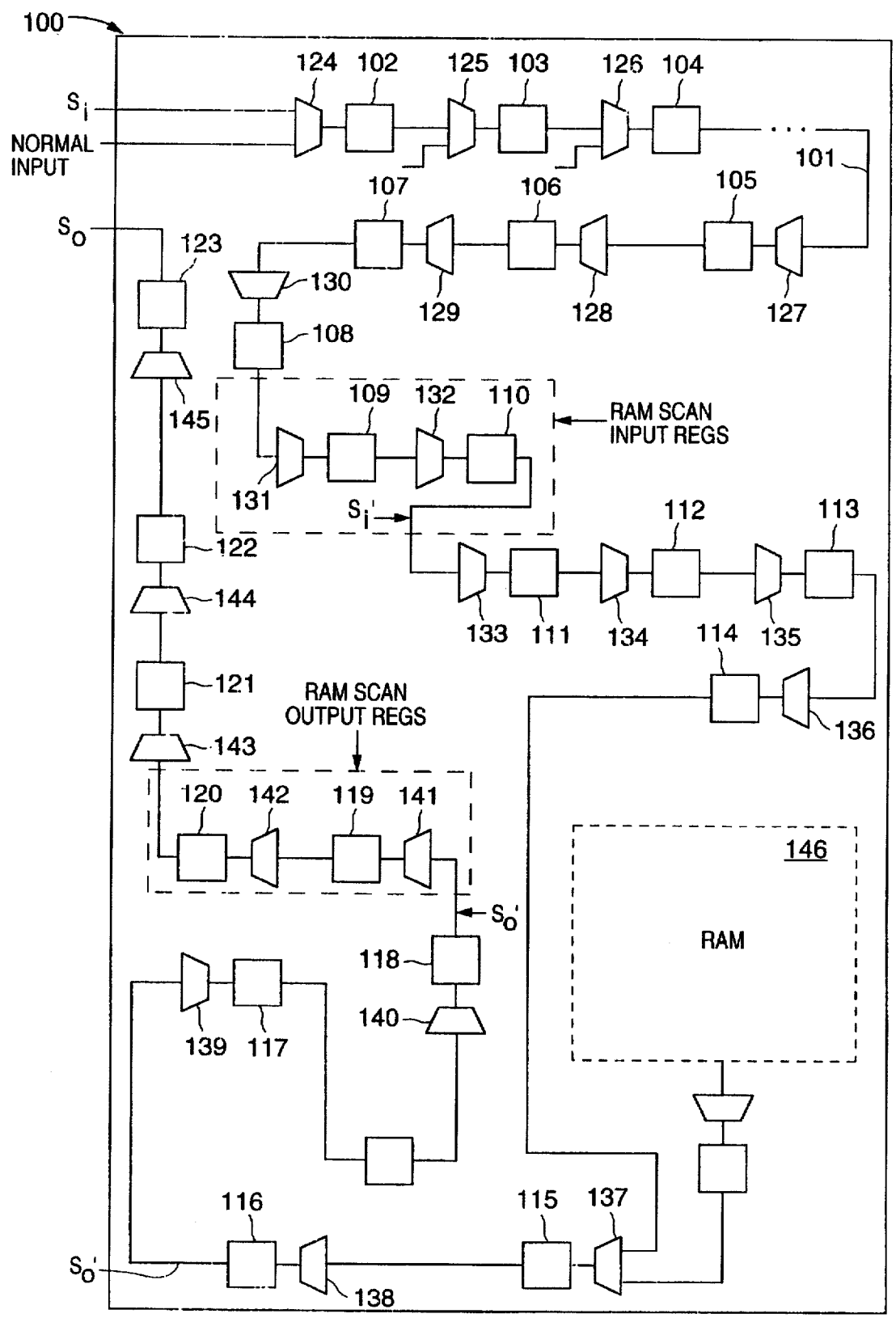
FIG. 1 shows a semiconductor chip that has a scan chain, which is used to shift out the contents of a number of registers of interest.

FIG. 1 shows a processor chip 100 that has a scan chain 101, which is used to shift out the contents of a number of registers 102–123 of interest. In the currently preferred embodiment, processor chip 100 is a graphics chip that is used to calculate geometric data used to display graphics on a computer screen. Registers 102–123 store bits of information being processed by the chip. They can be flip-flops. Multiplexers 124–145 are placed in front of each of the registers 102–123 under test. These multiplexers 124–145 are used to select either the Scan-In ($S_i$) signal or the normal operational signal for input to the registers 102–123.

During regular operation, multiplexers 124–145 select the normal input to registers 102–123. The processor runs according to one or more system clocks. In test mode, the $S_i$ signal is selected by multiplexers 124–125 for input to the registers 102–123. Test data can be sequentially scanned into registers 102–123 by shifting it in one bit at a time according to a test clock. For example, the first test bit of Si is shifted into register 102 via multiplexer 124. Next, the second test bit is shifted into register 102 via multiplexer 124, and the first test bit is shifted from register 102 into register 103 via multiplexer 125. This process is repeated for each test bit until each of the registers contains the test data. Once the registers have been properly configured to the desired state, a command is issued to execute one clock cycle, and the contents of the registers 102–123 can be shifted out and compared with the expected data. This procedure is normally used to determine if the device has been fabricated correctly. If it is used during debugging, it is necessary to have an external controller which is connected to the $S_i$ and $S_o$ pins of the chip.

In the current invention, a portion of scan chain 101 is also used to read or write locations of interest of RAM 146. In FIG. 1, this sub-chain contains flip flops 109–110, 111–120 and is split into three sections. One section of this subchain is the RAM scan input registers 109–110. A second section is the RAM scan output registers 119–120. The third section is the diagnostic portion of the circuit which will be accessed during debug of the device and the code which runs on the device. It includes the registers which interface to the RAMs 146 (114, 115). Note that RAM 146 can be SRAM of DRAM or any similar storage device. It may also include other registers on the device (111–113, 116–118). The $S_i'$ signal feeds into the diagnostic subchain, while the $S_o'$ signal is fed by the diagnostic subchain.

Figure 2:
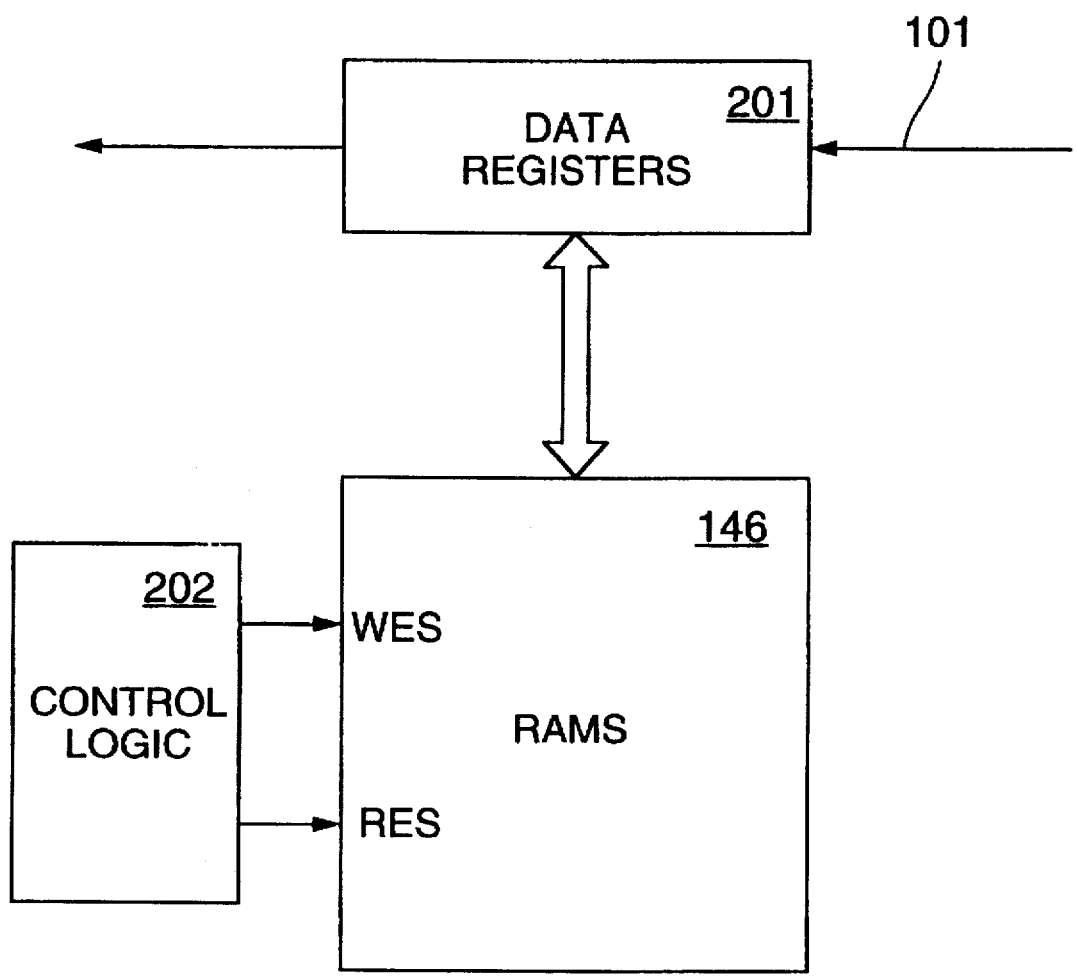
FIG. 2 is a block diagram showing how the scan chain is used to read data into and out from the RAM.

Referring to FIG. 2, a block diagram shows how the scan sub-chain is used to read data into and out from the RAM 146. Each of the thirty-one RAMS of RAM block 146 has a corresponding registered interface. In other words, each address/data port of a given RAM is immediately connected to a flip-flop. During some point in execution, such as by establishing a breakpoint, processor 100 is stalled. The current state of the processor sub-chain is read, shifted, read, shifted, read, etc., via the scan sub-chain and saved into a buffer or memory. Simultaneously, addresses are shifted into address registers so that they line up with the appropriate RAMs. Control logic 202 issues a Read Enable signal to RAM 146. Control logic 202 also issues addresses corresponding to the locations where the desired data to be read is stored. Thereupon, RAM 146 sends the contents corresponding to the specified locations to data registers 201. Scan chain 101 is routed through the data registers 201. Thereby, the scan sub-chain is used to read out the bits of data contained in data registers 201 in a manner as described above. Hence, the state of RAM 146 can be determined at that particular point during functional execution. Once the data from RAM 146 has been accessed, the original state is fed back into the corresponding registers, and processor 100 is allowed to continue its normal operation.

Likewise, scan sub-chain can also be used to write data into RAM 146. This is accomplished by using the scan sub-chain to load data registers 201 with the data to be written. Control logic 202 then issues a Write Enable command to write the contents of data registers 201 into the appropriate address locations. This process is repeated until all of the desired data is loaded into RAM 146.

Figure 3:
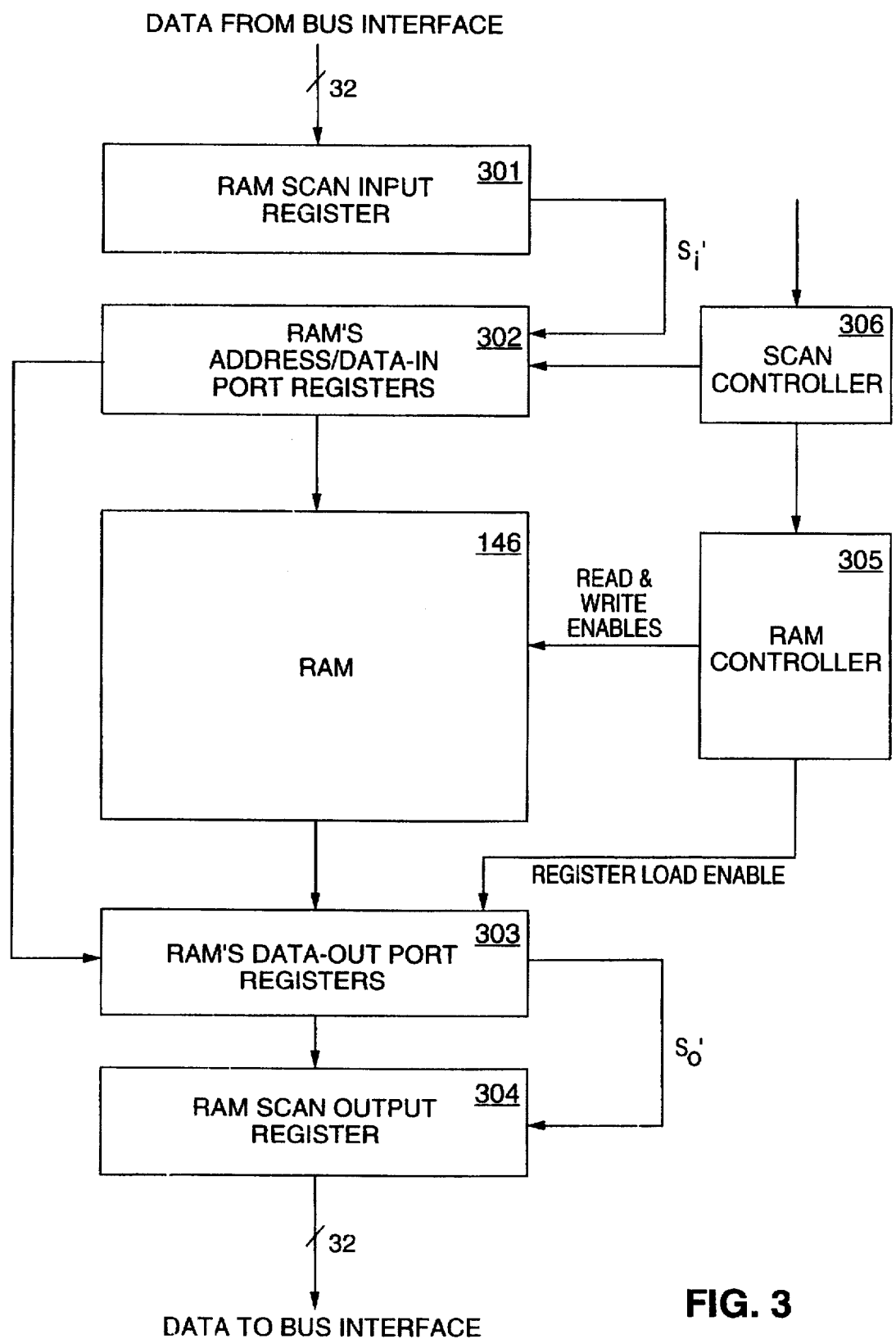
FIG. 3 is a block diagram showing the control logic, data registers, address registers, and Read/Write Enable lines associated with reading the data into and out of the RAM.

FIG. 3 is a block diagram showing the control logic, data registers, address registers, and Read/Write Enable lines associated with reading the data into and out of the RAM. In order to read data from RAM 146, an address must be supplied. The address specifies the location of the contents stored within RAM 146 that the user wishes to access. The address is loaded from the bus interface into the RAM scan input register 301. This address is then serially shifted into the RAM's address/data-in port registers 302. The RAM controller 305 receives a command in test mode from scan controller 306, to perform a read operation. It generates the appropriate Read Enable signals to initiate the read sequence, and a register load enable signal is sent to the RAM's data-out port registers 303. The data corresponding to the address contained in the RAM's address/data-in port registers 302 is then read from RAM 146 and stored into the RAM's data-out port registers 303. The data is then shifted out of the scan sub-chain running through the RAM's data-out port registers 303 and accumulated in the RAM scan output registers 304. Finally, the accumulated data is transmitted via the data bus interface. It should be noted that the present invention allows access to the RAM's data without having any detrimental side-affects which might inadvertently alter the RAM data.

For a write operation, the address that the data is to be written to, and the data are sent to the RAM scan input register 301. The actual data to be written is shifted in the RAM's address/data-in port registers 302. RAM controller 305 receives a command in test mode from scan controller 306, to write the data to RAM 146. It issues the Write Enable signals to initiate the write operation. The data is then written to the specified address. In this manner, the present invention provides RAM access with minimal overhead. A small amount of additional control logic is required for the diagnostic load into the read-data registers, as well as to generate the diagnostic write enable signals to the individual RAMS.

Figure 4:
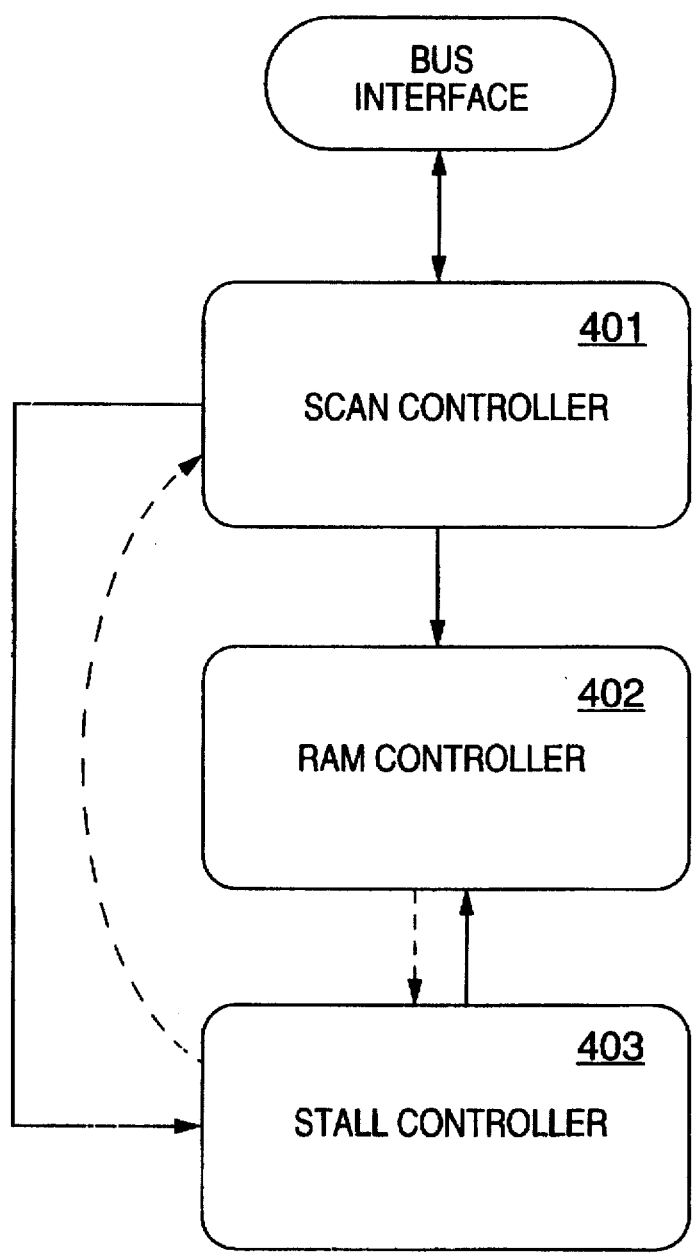
FIG. 4 is a flow diagram describing the sequence of control signals corresponding to a RAM access operation.

FIG. 4 is a flow diagram describing the sequence of control signals corresponding to a RAM access operation. Initially, the processor is operating under normal circumstances. When the user wishes to access the RAM at a particular point in the execution sequence, scan controller 401 sends a command to stall controller 403. Upon receiving this command, stall controller 403 sends a signal to RAM controller 402 to indicate a halt in RAM functions. Upon receiving the signal from stall controller 403, RAM controller 402 sends an acknowledgment signal (shown in dashed line) back to stall controller 403. In some embodiments, RAM controller 402 has the capability of simultaneously handling multiple accesses, in which case, RAM controller 402 may wait until all outstanding accesses complete, before ceasing the normal functions. In some instances, it is not necessary that all outstanding accesses complete before stopping the functions.

Once the RAM has been stopped at a specific state, the scan controller 401, under directions from the bus interface, shifts out the current state of the processor and makes it available through the bus interface. Next, the scan chain controller 401 performs the shifting of the RAM address and data that is to read or written. The scan controller 401 then instructs the RAM controller 402 to read data or write data to the RAM. The scan controller 401 then shifts out any data read and makes it available to the bus interface. When the RAM access is finished, the bus interface informs the scan controller 401 to shift back in the original state. The bus interface, via the scan controller 401, also instructs the stall controller 403 to continue with normal functions, and stall controller 403 informs RAM controller 402 to continue with its normal functions.

Figure 5:
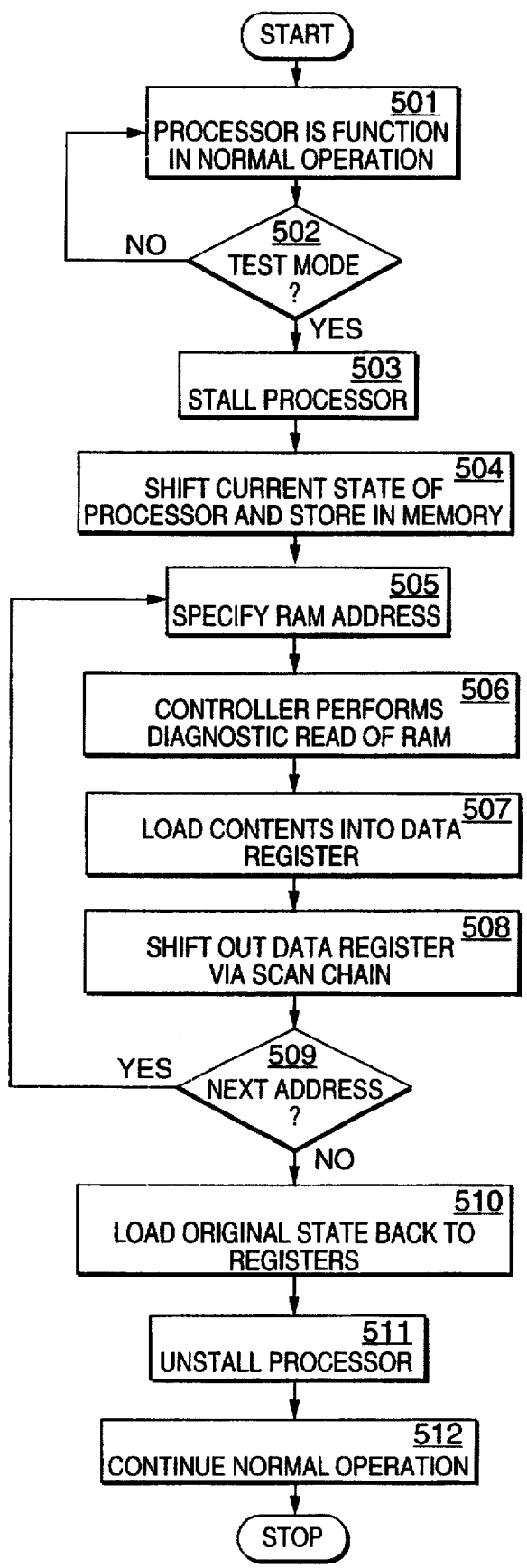
FIG. 5 is a flowchart describing the steps in accessing a RAM memory.

FIG. 5 is a flowchart describing the steps in accessing a RAM memory. Initially, the processor is functioning in a normal mode of operation, step 501. The processor continues in its normal mode of operation until it receives an instruction that causes it to shift to a test mode, step 502. When the processor is placed into the test mode, it is stalled, step 503. The current state of the processor is then shifted out by using the scan sub-chain and temporarily stored in memory, step 504. The RAM address defining the location of the data to be read is specified, using the scan sub-chain, in step 505. Next, the controller performs a diagnostic READ of the RAM, step 506. The contents of the RAM at that address is loaded into a data register, step 507. The data in the data register is then shifted out by the scan sub-chain, step 508. Steps 505–509 are repeated for each address until the portion of interest of the RAM is completely accessed, whereupon the original state of the processor is then loaded back to the registers, step 510. Afterwards, the processor is unstalled, step 511. And the processor is allowed to continue with its normal mode of operation, step 512.

It should be noted that the present invention is not limited to just accessing the contents of RAM. The present invention can also be applied to accessing the states of other types of data as well. For example, data stored in other mechanisms, which are not easily accessible, can be written into special test registers. The scan chain can be routed through these special test registers. In this manner, the data can be serially shifted out of the special test registers via the scan chain and examined.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a semiconductor device having a processor for processing digital data and a memory for storing the digital data, an apparatus for accessing digital data stored in the memory at a particular point of execution of the semiconductor device, comprising:

a stall controller for stalling the semiconductor device when the particular point of execution is reached;

a plurality of test registers coupled to the memory;

a memory controller coupled to the memory, wherein the memory controller instructs the memory to load the test registers with data corresponding to a memory address;

a scan chain coupled to the test registers for sequentially outputting bits of data stored in the test registers, wherein the digital data stored in the memory at the particular point of execution is determined by examining a scan chain output signal.

2. The apparatus of claim 1, wherein the scan chain is comprised of a multiplexer coupled to each of the test registers, wherein the multiplexer selects either a normal mode of operation or a test mode of operation.

3. The apparatus of claim 1, wherein if the semiconductor is in the test mode of operation, a first output bit from a first register is shifted into a second register and a second output bit from the second register is shifted out from the scan chain.

4. The apparatus of claim 1, wherein the memory controller instructs the memory to load only selected portions of data into the test registers.

5. The apparatus of claim 1, wherein the semiconductor device performs geometric calculations for rendering three-dimensional images on a computer screen.

6. The apparatus of claim 1, wherein the memory is comprised of a random access memory.

7. The apparatus of claim 1 further comprising a FIFO buffer coupled to the test registers for performing a diagnostic read back of the data.

8. In a processor of a computer system used for processing data, wherein the data is stored in a first memory of the computer system, a method for accessing the first memory at a particular point of execution during system operation, comprising the steps of:

stalling the processor at that particular point of execution;

specifying an address corresponding to a location of the memory that is to be read;

generating a command signal to read data from the memory stored at the specified address;

loading the data into a second memory;

shifting out the data from the second memory.

9. The method of claim 8, wherein the first memory is a random access memory, the second memory is a register, and the shifting step is performed by a scan chain.

10. The method of claim 9 further comprising the step of multiplexing between a first signal and a second signal that are input to the processor, wherein the first signal corresponds to the normal mode of operation and the second signal corresponds to a diagnostic mode of operation.

11. The method of claim 9 further comprising the steps of:

stalling the processor at a second point during system operation;

storing a second state of the processor corresponding to the second point;

loading data from the first memory into the second memory;

shifting the data out from the second memory;

loading the second state back to the processor;

unstalling the processor.

12. The method of claim 9 further comprising the steps of:

running the processor in a normal mode of operation;

detecting when the particular point of execution is reached;

storing the current state of the processor at the particular point of execution in a third memory after the processor has been stalled;

loading the current state from the third memory back to the processor after the data has been shifted out from the second memory;

unstalling the processor;

continuing system operation.

13. The method of claim 8, wherein the stalling step is comprised of the steps of:

generating a command signal from a scan controller coupled to the processor to a stall controller coupled to the memory when the particular point of execution is reached;

signaling to a memory controller coupled to the memory by the stall controller to halt memory operations upon receiving the command signal;

waiting until all outstanding memory accesses have completed before memory operations are halted;

reading the data from the first memory according to the memory controller;

resuming normal operations after the first memory is accessed.

14. A semiconductor chip comprising:

a processor for processing data;

a RAM coupled to the processor for storing the data;

a plurality of registers coupled to the RAM for storing the data;

a stall controller for stalling the processor during system operation in order to test the processor;

a RAM controller coupled to the RAM memory for causing data stored in the RAM to be loaded into the registers when the processor is stalled;

a scan chain coupled to the plurality of registers, wherein the scan chain serially shifts out the bits of data stored in the registers after the registers have been loaded with data from the RAM, wherein contents of the RAM is determined by examining the data shifted out by the scan chain.

15. The semiconductor chip of claim 14, wherein the semiconductor chip is a graphics processor used to calculate geometry data for the display of graphics on a computer screen.

16. The semiconductor chip of claim 15 further comprising a buffer for storing a state of the processor when the processor is stalled, wherein the state is loaded back into the processor after the data is shifted out by the scan chain and the processor is allowed to unstall and continue with normal operations.

17. The semiconductor chip of claim 14, wherein the scan chain is comprised of a plurality of multiplexers coupled to the registers, wherein a multiplexer is coupled as an input to one of the registers and data is shifted through a chain of multiplexers and registers until the data exits from the chip.

* * * * *